United States Patent
Chen et al.

(10) Patent No.: US 9,431,822 B1
(45) Date of Patent: Aug. 30, 2016

(54) OVER-CURRENT PROTECTION DEVICE

(71) Applicant: POLYTRONICS TECHNOLOGY CORP., Hsinchu (TW)

(72) Inventors: Kuo Hsun Chen, Toufen Town (TW); Yu Hsuan Tseng, Toufen Township, Miaoli Colunty (TW); Yi An Sha, New Taipei (TW)

(73) Assignee: POLYTRONICS TECHNOLOGY CORP., Hsinchu (TW)

( * ) Notice: Subject to any disclaimer, the term of this patent is extended or adjusted under 35 U.S.C. 154(b) by 29 days.

(21) Appl. No.: 14/619,851

(22) Filed: Feb. 11, 2015

(30) Foreign Application Priority Data

Aug. 5, 2014 (TW) .............................. 103126753 A

(51) Int. Cl.
| | |
|---|---|
| *H01C 7/10* | (2006.01) |
| *H02H 9/02* | (2006.01) |
| *H01C 7/00* | (2006.01) |
| *H01C 7/02* | (2006.01) |

(52) U.S. Cl.
CPC .............. *H02H 9/026* (2013.01); *H01C 7/008* (2013.01); *H01C 7/021* (2013.01); *H01C 7/028* (2013.01)

(58) Field of Classification Search
CPC .......... H01C 7/008; H01C 7/21; H01C 7/28; H02H 9/026
USPC .................................................. 338/22 R, 20
See application file for complete search history.

(56) References Cited

U.S. PATENT DOCUMENTS

| | | | | |
|---|---|---|---|---|
| 6,143,206 | A * | 11/2000 | Handa .................... | H01C 7/027 219/541 |
| 6,778,062 | B2 * | 8/2004 | Handa ..................... | C08K 3/08 338/22 R |
| 7,001,538 | B2 * | 2/2006 | Lee .......................... | H01B 1/24 252/511 |
| 7,382,224 | B2 * | 6/2008 | Wang ..................... | H01C 7/027 219/548 |
| 8,446,245 | B2 | 5/2013 | Wang et al. | |
| 8,536,973 | B2 * | 9/2013 | Lo ............................ | H01C 7/13 338/22 R |
| 2009/0045908 | A1 * | 2/2009 | Tanaka ................... | H01C 7/027 338/25 |
| 2013/0200988 | A1 * | 8/2013 | Lo ............................ | H01C 7/13 338/22 R |

FOREIGN PATENT DOCUMENTS

| | | |
|---|---|---|
| CN | 102664081 A | 9/2012 |
| TW | I434300 B | 4/2014 |

* cited by examiner

*Primary Examiner* — Kyung Lee
(74) *Attorney, Agent, or Firm* — Egbert Law Offices, PLLC

(57) ABSTRACT

An over-current protection device includes two metal foils and a PTC material layer laminated therebetween. The PTC material layer has a volumetric resistivity between about 0.07 Ω-cm and 0.45 Ω-cm. The PTC material layer comprises a crystalline polymer and first and second conductive fillers dispersed therein. The first conductive filler is carbon black powder. The second conductive filler is selected from the group consisting of metal powder and conductive ceramic powder and has a volumetric resistivity less than 0.1 Ω-cm. The weight ratio of the second conductive filler to the first conductive filler is less than 4. The resistance jump R300/Ri of the over-current protection device is in the range from 1.5 to 5, where Ri is an initial resistance and R300 is a resistance after tripping 300 times.

14 Claims, 1 Drawing Sheet

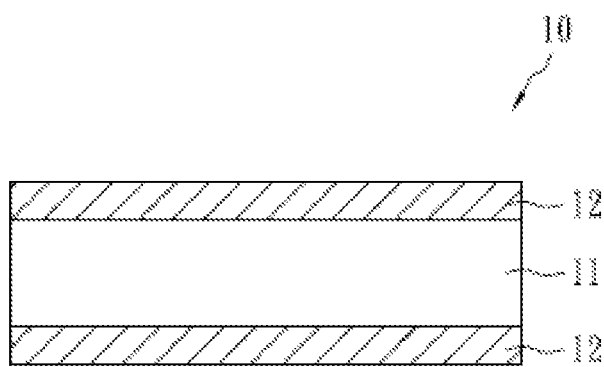

OVER-CURRENT PROTECTION DEVICE

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present application relates to an over-current protection device, and more particularly to an over-current protection device having low resistivity, superior resistance repeatability and good cycle life test results.

2. Description of Related Art Including Information Disclosed Under 37 CFR 1.97 and 37 CFR 1.98

Because the resistance of a conductive composite material having positive temperature coefficient (PTC) characteristic is very sensitive to temperature variation, it can be used as the material for current sensing devices, and has been widely applied to over-current protection devices or circuit devices. The resistance of the PTC conductive composite material remains extremely low at a normal temperature, so that the circuit or cell can operate normally. However, when an over-current or an over-temperature event occurs in the circuit or cell, the resistance instantaneously increases to a high resistance state, e.g., at least $10^2\Omega$, so as to suppress over-current and protect the cell or the circuit device.

In general, the PTC conductive composite material contains crystalline polymer and conductive filler. The conductive filler is dispersed uniformly in the crystalline polymer. The crystalline polymer is usually a polyolefin polymer such as polyethylene. The conductive filler usually contains carbon black powder. However, carbon black exhibits low electrical conductivity and therefore is unsatisfactory to the demands of low resistivity applications.

U.S. Pat. No. 8,446,245 discloses the use of mixture of conductive ceramic filler and carbon black in an over-current protection device to acquire good performance on volumetric resistivity and resistance repeatability. The resistance jump R100/Ri of the over-current protection device is about 3-20, where Ri is initial resistance and R100 is the resistance after tripping 100 times. With the advancement of the over-current protection device, stricter requirement to life cycle is demanded to avoid the device being burned out in long-term usage. In the present application, an improved over-current protection device to U.S. Pat. No. 8,446,245 is devised in obtaining better performance on life cycle tests.

BRIEF SUMMARY OF THE INVENTION

The present application provides an over-current protection device, in which carbon black mixed with conductive metal and/or ceramic powder as conductive filler is uniformly dispersed in crystalline polymer, so as to obtain low volumetric resistivity, good resistance repeatability performance and the ability to pass rigorous life time tests.

In accordance with an embodiment of the present application, an over-current protection device includes two metal foils and a PTC material layer laminated therebetween. The PTC material layer has a volumetric resistivity between about 0.07 $\Omega$-cm and 0.45 $\Omega$-cm. The PTC material layer comprises a crystalline polymer and first and second conductive fillers dispersed therein. The first conductive filler is carbon black. The second conductive filler comprises metal powder and/or conductive ceramic powder and has a volumetric resistivity less than 0.1 $\Omega$-cm. The weight ratio of the second conductive filler to the first conductive filler is less than 4. The resistance jump R300/Ri of the over-current protection device is in the range from 1.5 to 5, where Ri is an initial resistance and R300 is a resistance after the over-current protection device has been tripped 300 times.

In an embodiment, the crystalline polymer comprises 10-30% by weight of the PTC material layer. The first conductive filler comprises 15-40% by weight of the PTC material layer. The second conductive filler comprises 30-70% by weight of the PTC material layer.

In an embodiment, the resistance jump R300/Ri of the over-current protection device is in the range of 1.5 to 3.

In an embodiment, the resistance jump R100/Ri of the over-current protection device is in the range of 1 to 3, where R100 is a resistance after tripping 100 times.

In an embodiment, the over-current protection device can pass life cycle test undergoing 16V/50 A for 300 times without being blown. More specifically, the device is subjected to 16V and 50 A for 300 cycles, and in each cycle the voltage and current hold for 10 seconds and are off for 60 seconds until next cycle.

In an embodiment, the crystalline polymer comprises crystalline polyolefines, copolymer of olefin monomer and acrylic monomer or copolymer of olefin monomer and vinyl alcohol monomer.

In an embodiment, the crystalline polymer comprises high-density polyethylene, medium-density polyethylene, low-density polyethylene, polyvinyl wax, vinyl polymer, polypropylene, polyvinyl chloride, polyvinyl fluoride, copolymer of ethylene and acrylic acid, copolymer of ethylene and acrylic resin, copolymer of ethylene and vinyl alcohol, or mixture thereof.

In an embodiment, the metal powder is selected from the group consisting of nickel, cobalt, copper, iron, tin, lead, silver, gold, platinum or alloy thereof.

In an embodiment, the conductive ceramic powder comprises tungsten carbide, vanadium carbide, titanium carbide, boron carbide, silicon carbide, geranium carbide, tantalum carbide, zirconium carbide, chromium carbide, molybdenum carbide, titanium boride, vanadium boride, zirconium boride, niobium boride, molybdenum boride, hafnium boride, zirconium nitride, and combinations thereof, e.g., mixture, solid solution or core-shell.

In an embodiment, the second conductive filler comprises titanium carbide, and the over-current protection device can pass the cycle life test undergoing 30V/50 A without being blown.

In an embodiment, the metal or conductive ceramic filler has a particle size of 0.01-100 µm, or preferably between 0.1 and 50 µm. The conductive carbon black has a particle size between 15 nm and 75 nm.

In an embodiment, the thickness of the PTC material layer is greater than 0.1 mm, or preferably greater than 0.2 mm. Moreover, the thickness of the PTC material layer is preferably less than 3 mm.

In an embodiment, the metal foils may comprise one or more rough surfaces with nodular protrusions in physical contact with the PTC material layer.

Two metal electrode sheets may be jointed to the two metal foils of the over-current protection device by reflow or spot-welding process to form an assembly of, for example, axial-leaded, radial-leaded, terminal or surface mountable device. The two metal foils of the over-current protection device can be connected to a power source to form a circuit, and the PTC material layer will activate or trip to protect the circuit when over-current occurs.

BRIEF DESCRIPTION OF THE SEVERAL VIEWS OF THE DRAWINGS

The present application will be described according to the appended drawings in which:

FIG. 1 illustrates an over-current protection device in accordance with an embodiment of the present application.

DETAILED DESCRIPTION OF THE INVENTION

The making and using of the presently preferred illustrative embodiments are discussed in detail below. It should be appreciated, however, that the present application provides many applicable inventive concepts that can be embodied in a wide variety of specific contexts. The specific illustrative embodiments discussed are merely illustrative of specific ways to make and use the invention, and do not limit the scope of the invention.

The conductivity of conductive composite material is determined by the categories and the amount of the conductive filler. In recent years, rechargeable batteries such as lithium batteries and traditional carbon-zinc batteries for consumer electronic apparatuses gradually increase their lifetime. Because the electrical conductivity of carbon black is less than that of metal or ceramic filler, metal and/or conductive ceramic filler is introduced in this application to increase electrical conductivity. However, because the conductive ceramic filler stacks to form conductive paths, the amount of the conductive paths is decreased when the crystalline polymer of the composite material is heated to be re-crystallized. As a result, the trip jump or resistance jump is too high when the conductive composite material undergoes repetitive over-current or over-temperature events, and consequently the lifetime of battery is shortened.

Because carbon black particles have strong interaction with organic compounds, they can be well adhered to polyolefines and perform better trip jump behavior. In order to decrease the resistance jump of the over-current protection device after repetitive trips and sustain low volume resistivity of the conductive composite material, carbon black filler together with conductive metal and/or ceramic filler are added in the crystalline polymer in the present application. As a result, the PTC material has good resistance jump performance induced by the use of carbon black and high conductivity induced by conductive metal or ceramic powder. Moreover, it is desirable to pass rigorous cycle life test by using appropriate weight ratio of the conductive fillers.

The composition of the over-current protection device in accordance with exemplary embodiments Em. 1-6, comparative examples Comp. 1-4, and related manufacturing process are stated below.

The composition and weight (unit: gram) of PTC material layer of the over-current protection device of the present application is shown in Table 1. The crystalline polymer comprises polyethylene such as high density polyethylene (HDPE). For example, TAISOX HDPE/9001 of which a density is 0.951 g/cm' and melting point is 130° C., a product of *Formosa* Plastics Corporation. The conductive fillers comprise carbon black powder associated with metal and/or conductive ceramic powder. Metal powder may use nickel powder such as Atlantic Equipment Engineers (AEE) NI-102, which is in the form of flake and has a particle size of 3 μm and a resistivity ranging from 6 μΩ-cm to 15 μΩ-cm. The conductive ceramic powder may comprise tungsten carbide or titanium carbide. Tungsten carbide may use AEE WP-301 of a resistivity about 80 μΩ-cm and a particle size about 1-5 μm. Titanium carbide may use AEE TI-301 of a resistivity about 180-250 μΩ-cm and a particle size about 1-5 μm. In practice, the metal and/or conductive ceramic powder has a volumetric resistivity less than 0.1 Ω-cm.

In addition to carbon black powder, the conductive filler further comprises with titanium carbide, tungsten carbide and/or nickel powder. Comp. 1 purely uses carbon black powder as conductive filler. Comp. 2-4 use carbon black (CB) mixing with titanium carbide (TiC), tungsten carbide (WC) and nickel (Ni) powder, respectively, with larger amounts than exemplary embodiments. The weight ratios CB:TiC, CB:WC or CB:Ni of Comp. 2-4 are about 1:5. The crystalline polymer comprises 10-30% by weight of the PTC material layer, and the conductive carbon black powder comprises 15-40% by weight of the PTC material layer. In particular, the conductive carbon black powder may comprise 20%, 25%, 30% or 35% by weight of the PTC material layer. Metal and/or conductive ceramic powder may comprise 30-70% by weight of the PTC material layer, e.g., 35%, 40%, 45%, 50%, 55%, 60% or 65%. In the exemplary embodiments, the weight ratios CB: (TiC, WC or Ni) are less than 1:4, i.e., the weight of metal or conductive ceramic powder divided by the weight of the carbon black powder is less than 4. In exemplary embodiments Em. 1-3, the ratios CB:TiC, CB:WC and CB:Ni are about 1:3.9. In exemplary embodiments Em. 4-6, the ratios CB:TiC, CB:WC and CB:Ni are about 1:1.

TABLE 1

|         | Polymer | CB    | TiC   | WC    | Ni    | CB:TiC | CB:WC | CB:Ni | ρ(Ω-cm) |
|---------|---------|-------|-------|-------|-------|--------|-------|-------|---------|
| Comp. 1 | 44.0%   | 56.0% | —     | —     | —     | —      | —     | —     | 0.5140  |
| Comp. 2 | 17.0%   | 19.5% | 35.5% | —     | —     | 1:5    | —     | —     | 0.2807  |
| Comp. 3 | 12.0%   | 14.7% | —     | 73.3% | —     | —      | 1:5   | —     | 0.1998  |
| Comp. 4 | 13.0%   | 14.5% | —     | —     | 72.5% | —      | —     | 1:5   | 0.0981  |
| Em. 1   | 17.0%   | 16.6% | 65.0% | —     | —     | 1:3.9  | —     | —     | 0.3163  |

TABLE 1-continued

|      | Polymer | CB    | TiC   | WC    | Ni    | CB:TiC | CB:WC | CB:Ni | ρ(Ω-cm) |
|------|---------|-------|-------|-------|-------|--------|-------|-------|---------|
| Em. 2 | 13.0%  | 17.4% | —     | 68.2% | —     | —      | 1:3.9 | —     | 0.2206  |
| Em. 3 | 14.0%  | 17.2% | —     | —     | 67.3% | —      | —     | 1:3.9 | 0.1532  |
| Em. 4 | 27.0%  | 36.5% | 36.5% | —     | —     | 1:1    | —     | —     | 0.4261  |
| Em. 5 | 27.0%  | 36.5% | —     | 36.5% | —     | —      | 1:1   | —     | 0.3169  |
| Em. 6 | 29.6%  | 35.2% | —     | —     | 35.2% | —      | —     | 1:1   | 0.3925  |

The manufacturing process of the over-current protection device is described as follows. The raw material is fed into a blender (HAAKE 600) at 160° C. for two minutes. The procedure of feeding the raw material includes adding the crystalline polymers into the blender according to Table 1; after blending for a few seconds, then adding the conductive filler, e.g., carbon black, titanium carbide, tungsten carbide and/or nickel powder. The particle size of the titanium carbide, tungsten carbide and/or nickel powder is between 0.1 μm and 50 μm, whereas the particle size of carbon black powder is mainly between 15 nm and 75 nm. The rotational speed of the blender is set at 40 rpm. After blending for three minutes, the rotational speed is increased to 70 rpm. After blending for 7 minutes, the mixture in the blender is drained and thereby forms a conductive composition with positive temperature coefficient (PTC) behavior.

The above conductive composition is loaded symmetrically into a mold with outer steel plates and a 0.35 mm and 0.2 mm thick middle, wherein the top and the bottom of the mold are disposed with a Teflon cloth. The mold loaded with the conductive composition is pre-pressed for three minutes at 50 kg/cm², 180° C. Then the generated gas is exhausted and the mold is pressed for 3 minutes at 100 kg/cm², 180° C. Next, the press step is repeated once at 150 kg/cm², 180° C. for three minutes to form a PTC material layer 11 (refer to FIG. 1). In an embodiment, the thickness of the PTC material layer 11 is 0.3 mm. In practice, the thickness of the PTC material layer is usually greater than 0.1 mm, or preferably greater than 0.2 mm. Moreover, the thickness of the PTC material layer is less than 3 mm.

The PTC material layer 11 is cut into many pieces each with an area of 20×20 cm². Then, two metal foils 12 physically contact the top surface and the bottom surface of the PTC material layer 11, in which the two metal foils 12 are symmetrically placed upon the top surface and the bottom surface of the PTC material layer 11. In an embodiment, each metal foil 12 has a rough surface with plural nodules to physically contact the PTC material layer 11. Next, Teflon cloths and the steel plates are pressed to form a multi-layered structure. The multi-layered structure is again pressed for three minutes at 70 kg/cm², 180° C. Next, the multi-layered structure is punched or cut to form an over-current protection device 10 of 3 mm×4 mm.

The volumetric resistivity (ρ) of the PTC material layer 11 is calculated by formula (1) below.

$$\rho = \frac{R \times A}{L} \quad (1)$$

where R, A, and L indicate the resistance (Ω), the area, and the thickness of the PTC material layer 11, respectively. The volumetric resistivity value of the PTC material layer 11 of each of the exemplary embodiments and comparative examples is calculated according to the above formula and recorded in Table 1. It can be seen from Table 1 that the volumetric resistivity is in the range of 0.07-0.45 Ω-cm, and may be 0.1 Ω-cm, 0.15 Ω-cm. 0.2 Ω-cm, 0.3 Ω-cm or 0.4 Ω-cm in particular.

Table 2 shows the resistance jump and cycle life test results. Resistance jump R100/Ri and R300/Ri are shown in Table 2, where R100 and R300 indicate the resistance after the over-current protection device has been tripped 100 and 300 times, respectively. The resistance jump (resistance repeatability) R300/Ri is exemplified below. The values R300/Ri of the exemplary embodiments Em. 4-6 are less than 5, or approximately 1.5 to 3. R300/Ri of Comp. 1 containing only carbon black powder is relatively low, e.g., 2.74; however, its volumetric resistivity is too high, e.g., about 0.5 Ω-cm. Although Comp. 2-4 using titanium carbide, tungsten carbide and nickel have low volumetric resistivity, R300/Ri is greater than 5 or R100/Ri greater than 3.

Moreover, the over-current protection devices of the exemplary embodiments and comparative examples are subjected to 300-times cycle life tests. For 8V/50 A cycle life test, 8V and 50 A are applied to the over-current protection device and are held for 10 seconds, and then the voltage and current are off for 50 seconds until next cycle. This operation is repeated for 300 times to verify whether the device is blown. Similar cycle life tests of different voltage condition 12V/50 A, 16V/50 A, 20V/50 A and 30V/50 A are performed as well, and the test results are shown in Table 2. Comp. 1 containing only carbon black as conductive filler has the shortcomings of relatively high resistivity and failure to pass cycle life tests of 20V/50 A and 30V/50 A. Comp. 2 containing carbon black and titanium carbide has high R300/Ri (about 8.31) and fails to pass cycle life tests of 20V/50 A and 30V/50 A. Comp. 3 containing carbon black and tungsten carbide has high R300/Ri (about 6.53) and fails to pass cycle life tests of 16V/50 A, 20V/50 A and 30V/50 A. Comp. 4 containing carbon black and nickel powder has R300/Ri of about 5.47 and fails to pass cycle life tests of 16V/50 A, 20V/50 A and 30V/50 A. In contrast, all the exemplary embodiments Em. 1 to Em. 6 have volumetric resistivity less than 0.45 Ω-cm and resistance jump R300/Ri less than 5 and pass cycle life tests at 16V/50 A for 300 times. In particular, Em. 1 and Em. 4 using carbon black and titanium carbide powder as conductive filler, which pass all the cycle life tests including 20V/50 A and 30V/50 A without being blown, show optimal cycle life test results.

TABLE 2

|  | Rjump | | Cycle life test (300 cycles) V: Pass; X: Fail | | | | |
|---|---|---|---|---|---|---|---|
|  | | | 8 V/ | 12 V/ | 16 V/ | 20 V/ | 30 V/ |
|  | R300/Ri | R100/Ri | 50 A | 50 A | 50 A | 50 A | 50 A |
| Comp. 1 | 2.74 | 1.63 | V | V | V | X | X |
| Comp. 2 | 8.31 | 5.83 | V | V | V | X | X |
| Comp. 3 | 6.53 | 3.53 | V | V | X | X | X |
| Comp. 4 | 5.47 | 3.17 | V | V | X | X | X |

TABLE 2-continued

| | | Cycle life test (300 cycles) V: Pass; X: Fail | | | | |
|---|---|---|---|---|---|---|
| | Rjump | 8 V/ | 12 V/ | 16 V/ | 20 V/ | 30 V/ |
| | R300/Ri R100/Ri | 50 A | 50 A | 50 A | 50 A | 50 A |
| Em. 1 | 4.15 2.93 | V | V | V | V | V |
| Em. 2 | 4.89 2.08 | V | V | V | X | X |
| Em. 3 | 4.14 2.55 | V | V | V | X | X |
| Em. 4 | 1.72 1.32 | V | V | V | V | V |
| Em. 5 | 2.83 1.89 | V | V | V | V | X |
| Em. 6 | 2.13 1.52 | V | V | V | V | X |

In view of the above, it is noted that carbon black can effectively solve inferior resistance jump problem resulted from the device using only ceramic filler, and metal and conductive ceramic powder can lower volumetric resistivity. Moreover, it is desirable to improve cycle life test results by using carbon black and conductive ceramic powders of appropriate weight amount and ratio.

In addition to the material listed above, the PTC material layer may use crystalline polyolefines (e.g., high-density polyethylene (HDPE), medium-density polyethylene, low-density polyethylene (LDPE), polyvinyl wax, vinyl polymer, polypropylene, polyvinyl chloride and polyvinyl fluoride), copolymer of olefin monomer and acrylic monomer (e.g., copolymer of ethylene and acrylic acid or copolymer of ethylene and acrylic resin) or copolymer of olefin monomer and vinyl alcohol monomer (e.g., copolymer of ethylene and vinyl alcohol), and may include one or more crystalline polymer materials. The LDPE can be polymerized using Ziegler-Natta catalyst, Metallocene catalyst or the like, or can be copolymerized by vinyl monomer and other monomers such as butane, hexane, octane, acrylic acid, or vinyl acetate.

The metal powder may comprise nickel, cobalt, copper, iron, tin, lead, silver, gold, platinum or alloy thereof.

The conductive ceramic powder may comprise tungsten carbide, vanadium carbide, titanium carbide, boron carbide, silicon carbide, geranium carbide, tantalum carbide, zirconium carbide, chromium carbide, molybdenum carbide, titanium boride, vanadium boride, zirconium boride, niobium boride, molybdenum boride, hafnium boride, zirconium nitride, titanium nitride, and combinations thereof, e.g., mixtures, solid solutions or core-shells. The ceramic powder may be of debris, polygonal, spheral or flake shape, and its particle size is about 0.1-50 µm.

Traditional PTC material is difficult to withstand high voltage if the volumetric resistivity is less than 1 Ω-cm. In comparison with known arts, the voltage endurance of the present application is enhanced to a certain extent. In case of further improvement of voltage endurance, non-conductive filler such as inorganic compound may be added in the PTC material. For example, boron nitride, aluminum nitride, aluminum oxide, magnesium hydroxide with particle size of 0.1-30 µm to withstand higher voltage and current.

In accordance with the present application, carbon black together with metal or conductive ceramic powder are selected as conductive filler of the PTC material layer, thereby resolving the issue of inferior resistance jump results that may be found if using ceramic powder only. Further, the metal powder and the ceramic powder can lower volumetric resistivity, and the mixed composition can acquire good cycle lift test result and high voltage endurance.

The above-described embodiments of the present application are intended to be illustrative only. Numerous alternative embodiments may be devised by persons skilled in the art without departing from the scope of the following claims.

We claim:

1. An over-current protection device, comprising:
    two metal foils; and
    a PTC material layer laminated between the two metal foils and having a volumetric resistivity ranging from 0.07 to 0.45 Ω-cm, the PTC material layer comprising:
        at least one crystalline polymer;
        a first conductive filler being a carbon black powder;
        a second conductive filler comprising at least one of metal powder, conductive ceramic powder or mixture thereof, the second conductive filler having a particle size ranging from 0.1 to 50 µm, and a volumetric resistivity less than 0.1 Ω-cm;
    wherein the first and second conductive fillers are dispersed in the crystalline polymer, and a weight ratio of the second conductive filler divided by the first conductive filler is less than 4;
    wherein resistance jump R300/Ri of the over-current protection device is in the range of 1.5 to 5; Ri is an initial resistance and R300 is a resistance of the over-current protection device after tripping 300 times.

2. The over-current protection device of claim 1, wherein the crystalline polymer comprises 10-30% by weight of the PTC material layer, the first conductive filler comprises 15-40% by weight of the PTC material layer, and the second conductive filler comprises 30-70% by weight of the PTC material layer.

3. The over-current protection device of claim 1, wherein the R300/Ri is in the range of 1.5 to 3.

4. The over-current protection device of claim 1, wherein R100/Ri is in the range of 1 to 3, R100 is resistance after tripping 100 times.

5. The over-current protection device of claim 1, wherein the over-current protection device can pass a cycle life test undergoing 16V and 50 A for 300 times without being blown.

6. The over-current protection device of claim 1, wherein the crystalline polymer comprises polyolefines, copolymer of olefin monomer and acrylic monomer, copolymer of olefin monomer and vinyl alcohol monomer or mixture thereof.

7. The over-current protection device of claim 1, wherein the crystalline polymer comprises high-density polyethylene, medium-density polyethylene, low-density polyethylene, polyvinyl wax, vinyl polymer, polypropylene, polyvinyl chloride and polyvinyl fluoride, copolymer of ethylene and acrylic acid, copolymer of ethylene and acrylic resin, copolymer of ethylene and vinyl alcohol, or mixture thereof.

8. The over-current protection device of claim 1, wherein the conductive ceramic powder comprises nickel, cobalt, copper, iron, tin, lead, silver, gold, platinum, or alloy thereof.

9. The over-current protection device of claim 1, wherein the conductive ceramic powder comprises tungsten carbide, vanadium carbide, titanium carbide, boron carbide, silicon carbide, geranium carbide, tantalum carbide, zirconium carbide, chromium carbide, molybdenum carbide, titanium boride, vanadium boride, zirconium boride, niobium boride, molybdenum boride, hafnium boride, zirconium nitride, titanium nitride, or combinations thereof.

10. The over-current protection device of claim 1, wherein the second conductive filler comprises titanium carbide, and the over-current protection device can pass cycle life test undergoing 30V and 50 A for 300 times without being blown.

11. The over-current protection device of claim 1, wherein the carbon black powder has a particle size in the range of 15 nm to 75 nm.

12. The over-current protection device of claim 1, wherein the PTC material layer has a thickness greater than 0.1 mm.

13. The over-current protection device of claim 1, wherein the PTC material layer has a thickness less than 3 mm.

14. The over-current protection device of claim 1, wherein the metal foils comprise a rough surface with nodular protrusions and are in physical contact with the PTC material layer.

\* \* \* \* \*